(12) United States Patent
Iyer et al.

(10) Patent No.: US 10,936,529 B2
(45) Date of Patent: Mar. 2, 2021

(54) SYSTEM AND METHOD OF CONFIGURING FIELD PROGRAMMABLE LOGIC ARRAYS

(71) Applicant: Dell Products L.P., Round Rock, TX (US)

(72) Inventors: Shyamkumar Thiyagarajan Iyer, Austin, TX (US); Timothy M. Lambert, Austin, TX (US); Duk Moon Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/455,085

(22) Filed: Jun. 27, 2019

(65) Prior Publication Data
US 2020/0409901 A1    Dec. 31, 2020

(51) Int. Cl.
*G06F 13/42* (2006.01)
*G06F 9/455* (2018.01)
*G06F 15/78* (2006.01)

(52) U.S. Cl.
CPC ...... *G06F 13/4282* (2013.01); *G06F 9/45558* (2013.01); *G06F 15/7867* (2013.01); *G06F 2009/45595* (2013.01); *G06F 2213/0026* (2013.01)

(58) Field of Classification Search
CPC ............. G06F 13/4282; G06F 9/45558; G06F 15/7867
See application file for complete search history.

(56) References Cited

U.S. PATENT DOCUMENTS

| | | | | |
|---|---|---|---|---|
| 6,836,842 B1* | 12/2004 | Guccione | ............ | G06F 15/7867 713/100 |
| 9,257,987 B1* | 2/2016 | Molson | ............ | H03K 19/17728 |
| 2011/0138082 A1* | 6/2011 | Khatri | ............ | G06F 13/24 710/8 |
| 2015/0019777 A1* | 1/2015 | Venkata | ............ | G06F 13/4282 710/110 |

(Continued)

OTHER PUBLICATIONS

MCTP over PCI Express Access Control Extensions, Intel Corporation, Revision 0.7, Oct. 2015; 20 pages.

(Continued)

*Primary Examiner* — Tim T Vo
*Assistant Examiner* — Phong H Dang
(74) *Attorney, Agent, or Firm* — Baker Botts L.L.P.

(57) ABSTRACT

In one or more embodiments, one or more systems, methods, and/or processes may determine a Peripheral Component Interconnect Express (PCIe) endpoint, associated with a PCIe destination endpoint identification, includes a field programmable gate array (FPGA); may access a partial configuration for the FPGA; may construct multiple packets that include the PCIe destination endpoint identification and respective portions of the partial configuration for the FPGA; and may provide the multiple packets to the PCIe endpoint. In one or more embodiments, the one or more systems, methods, and/or processes may further map at least a portion of the FPGA to a virtual machine. In one or more embodiments, the one or more systems, methods, and/or processes may further combine the portions of the partial configuration for the FPGA to reconstruct the partial configuration for the FPGA; and may further program the FPGA with the partial configuration for the FPGA.

18 Claims, 5 Drawing Sheets

(56) References Cited

U.S. PATENT DOCUMENTS

2017/0097910 A1* 4/2017 Kumar .................... G06F 13/28
2018/0205553 A1* 7/2018 Hoppert .................. G06F 21/44
2019/0155767 A1* 5/2019 Cheong ............... G06F 12/0246

OTHER PUBLICATIONS

Management Component Transport Protocol (MCTP) PCIe VDM Transport Binding Specification, Distributed Management Task Force, Inc., Version 1.0.0, Document No. DSP0238, Jul. 28, 2009; 19 pages.
Management Component Transport Protocol (MCTP) Base Specification, Includes MCTP Control Command Specifications, Distributed Management Task Force, Inc., Version 1.1.0, Document No. DSP0236, Apr. 22, 2010; 82 pages.
Management Component Transport Protocol (MCTP) Host Interface Specification, Distributed Management Task Force, Inc., Version 1.0.0, Document No. DSP0256, Jul. 21, 2010; 19 pages.
Intel Ethernet Controller X540, Intel Corporation, 2012; 6 pages.

\* cited by examiner

SYSTEM AND METHOD OF CONFIGURING FIELD PROGRAMMABLE LOGIC ARRAYS

BACKGROUND

Field of the Disclosure

This disclosure relates generally to information handling systems and more particularly to configuring field programmable gate array of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine a Peripheral Component Interconnect Express (PCIe) endpoint, associated with a PCIe destination endpoint identification, includes a field programmable gate array (FPGA); may access a partial configuration for the FPGA; may construct multiple packets that include the PCIe destination endpoint identification and respective portions of the partial configuration for the FPGA; and may provide, via a PCIe root complex, the multiple packets to the PCIe endpoint. In one or more embodiments, the one or more systems, methods, and/or processes may further map at least a portion of the FPGA to a virtual machine.

In one or more embodiments, the one or more systems, methods, and/or processes may further receive, via the PCIe root complex, the multiple packets; may further combine the portions of the partial configuration for the FPGA to reconstruct the partial configuration for the FPGA; and may further program the FPGA with the partial configuration for the FPGA.

In one or more embodiments, programming the FPGA with the partial configuration for the FPGA may include programming the FPGA with the partial configuration for the FPGA while the FPGA is processing information. In one or more embodiments, providing, via the PCIe root complex, the multiple packets to the PCIe endpoint may include providing, via the PCIe root complex, the multiple packets to the PCIe endpoint without involving a memory medium of a host information handling system. For example, the memory medium of the host information handling system may be or include a volatile memory medium of the host information handling system.

In one or more embodiments, providing, via the PCIe root complex, the multiple packets to the PCIe endpoint may include providing, via the PCIe root complex, the multiple packets to the PCIe endpoint without involving a host operating system of a host information handling system. In one or more embodiments, accessing the partial configuration for the FPGA may include accessing the partial configuration for the FPGA via a network. In one or more embodiments, accessing the partial configuration for the FPGA may include accessing the partial configuration for the FPGA from a non-volatile memory medium.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a field programmable gate array (FPGA) may be configured to configure a first portion of the FPGA while a second portion of the FPGA remains unmodified. For example, configuring the first portion of the FPGA may include programming the FPGA with a subconfiguration that may target one or more specific regions of the FPGA. In one or more embodiments, a FPGA bitstream may include configuration data that may be utilized to program the FPGA. For example, a FPGA bitstream may be a file that may be utilized to program the FPGA. In one or more embodiments, programming a FPGA may include a process of loading a FPGA bitstream into the FPGA. In one or more embodiments, a FPGA subbitstream may include a subconfiguration of a FPGA.

In one or more embodiments, a host a Peripheral Component Interconnect Express (PCIe) based interface may change logic of a target FPGA region. In one example, a host specific driver, tool, and/or runtime environment may be utilized to change the logic of the target FPGA region. In another example, a Joint Test Action Group (JTAG) and/or a universal serial bus (USB) interface may be utilized to change the logic of the target FPGA region. In one or more embodiments, utilizing a host specific driver, tool, and/or runtime environment or one or more of JTAG and a USB may require cabling to an information handling system. In one or more remote managed environments, this may be considered a security issue and/or undesirable for scalable for many field programmable gate arrays (FPGAs) of the one or more remote managed environments, according to one or more embodiments.

In one or more embodiments, one or more systems, methods, and/or processes described herein may be utilized in configuring and/or reconfiguring one or more FPGAs. For example, one or more systems, methods, and/or processes described herein may be utilized in configuring and/or reconfiguring one or more FPGAs like one or more firmware-based subsystems. In one or more embodiments, one or more systems, methods, and/or processes described herein may utilize PCIe Vendor Defined message (VDM) Management Component Transport Protocol (MCTP) endpoint decoding in FPGA PCIe logic. For example, a baseboard management controller (BMC) may provide a FPGA configuration and/or a FPGA subconfiguration to an endpoint via PCIe VDM MCTP. In one or more embodiments, providing a FPGA configuration and/or a FPGA subconfiguration to an endpoint via PCIe VDM MCTP may be faster than providing the FPGA configuration and/or the FPGA subconfiguration to the endpoint via one or more of JTAG and USB, among others. For example, providing a FPGA configuration and/or a FPGA subconfiguration to an endpoint via PCIe VDM MCTP may permit an information handling system and/or an endpoint to process additional data. For instance, configuring a FPGA faster may reduce an amount of time utilized to configure and/or reconfigure the FPGA, which may permit the information handling system to process additional data during an amount of time transpiring.

In one or more embodiments, a BMC may establish communications to one or more FPGA integrated MCTP slave endpoints of an information handling system. For example, the BMC may determine partial configuration capabilities of the one or more FPGA integrated MCTP slave endpoints. For example, the partial configuration capabilities may include one or more of quantity, I/O access, and internal resources, among others. In one or more embodiments, a BMC may receive a request from a remote console to determine capabilities of the one or more FPGA integrated MCTP slave endpoints.

In one or more embodiments, a FPGA may receive multiple MCTP messages. For example, the multiple MCTP messages may include portions of a FPGA configuration or portions of a FPGA subconfiguration. For instance, the FPGA may construct the FPGA configuration from the portions of the FPGA configuration or may construct the FPGA subconfiguration from the portions of a FPGA subconfiguration. In one or more embodiments, the FPGA may store the FPGA configuration or the FPGA subconfiguration via a memory medium. In one example, the memory medium may include a volatile memory medium. In another example, the memory medium may include a non-volatile memory medium.

In one or more embodiments, the FPGA may include a first-in-first-out (FIFO) data structure. For example, the FPGA configuration or the FPGA subconfiguration may be provided to the FIFO data structure. For instance, the FIFO data structure may be utilized to configure the FPGA with the FPGA configuration or the FPGA subconfiguration. In one or more embodiments, the FIFO data structure may be or include a hardware FIFO data structure.

In one or more embodiments, a BMC may determine one or more attributes of a workload. For example, the one or more attributes of the workload may utilize a hardware component. For instance, the BMC may determine a FPGA configuration or a FPGA subconfiguration associated with a FPGA that may be utilized as the hardware component. In one or more embodiments, the BMC may determine a FPGA configuration or a FPGA subconfiguration associated based at least on the one or more attributes of the workload. In one or more embodiments, the BMC may provide the FPGA configuration or the FPGA subconfiguration to the FPGA. For example, the FPGA may be configured with the FPGA configuration or the FPGA subconfiguration to implement the hardware component. For instance, the workload may utilize the FPGA configured with the FPGA configuration or the FPGA subconfiguration.

In one or more embodiments, a FPGA subsystem (e.g., a FPGA configured with a subconfiguration) may be mapped to a virtual machine (VM). For example, the FPGA subsystem may be mapped to a VM via a hypervisor associated with the VM. In one or more embodiments, the VM may utilize the FPGA subsystem as a hardware accelerator. In one or more embodiments, the VM may utilize the FPGA subsystem as a hardware component. For example, the VM may utilize the FPGA subsystem as a physical hardware component.

Figure 1:
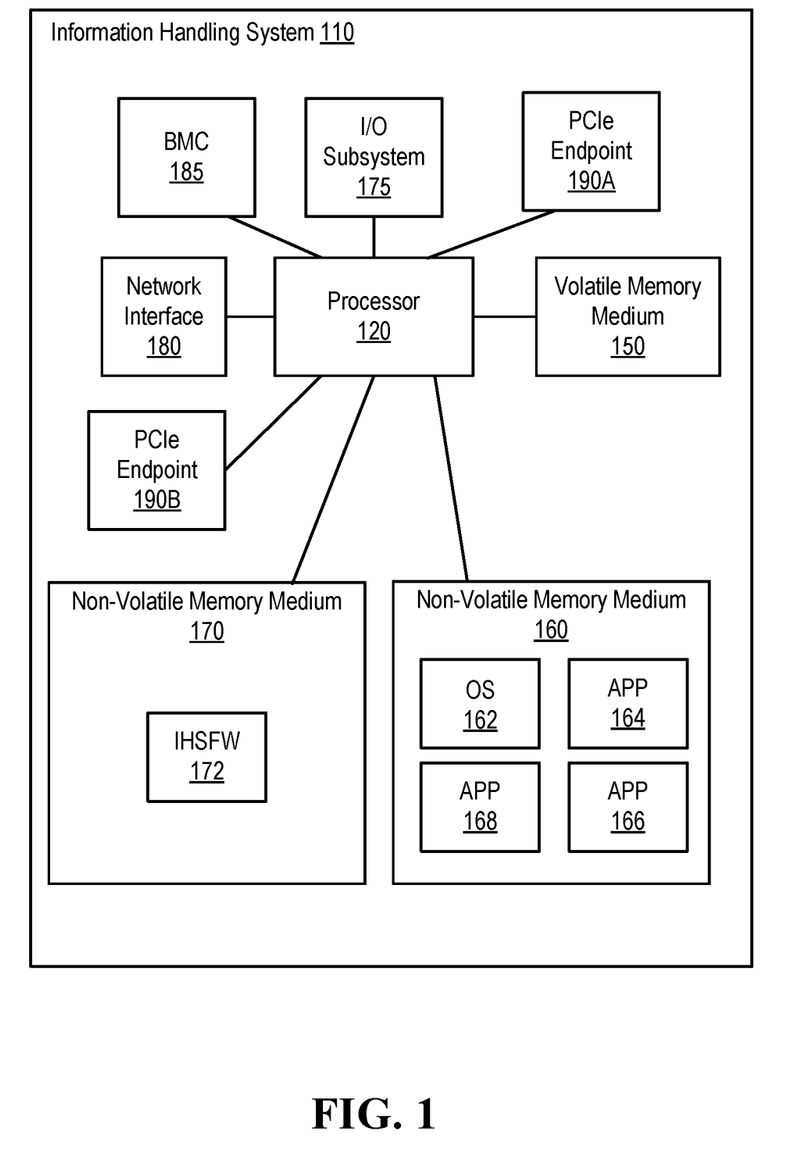
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a baseboard management controller (BMC) 185, and PCIe endpoints 190A and 190B. As illustrated, volatile memory medium 150, non-volatile memory media 160 and 170, I/O subsystem 175, network interface 180, BMC 185, and PCIe endpoints 190A and 190B may be communicatively coupled to processor 120.

In one or more embodiments, one or more of volatile memory medium 150, non-volatile memory media 160 and 170, I/O subsystem 175, network interface 180, BMC 185, and PCIe endpoints 190A and 190B may be communicatively coupled to processor 120 via one or more buses, one or more switches, and/or one or more root complexes, among others. In one example, one or more of volatile memory medium 150, non-volatile memory media 160 and 170, I/O subsystem 175, network interface 180, BMC 185, and PCIe endpoints 190A and 190B may be communicatively coupled to processor 120 via one or more PCI-Express (PCIe) root complexes. In another example, one or more of I/O subsystem 175, network interface 180, BMC 185, and PCIe endpoints 190A and 190B may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein. Although not specifically illustrated, processor 120 may include multiple processor cores, according to one or more embodiments. In one example, one or more processor cores of processor 120 may execute processor instructions from one or more of memory media 150, 160, and 170 in implementing one or more systems, one or more flowcharts, one or more methods, and/or one or more processes described herein. In another example, one or more processor cores of processor 120 may execute processor instructions via network interface 180 in implementing one or more systems, one or more flowcharts, one or more methods, and/or one or more processes described herein. Although not specifically illustrated, processor 120 may include one or more FPGAs, according to one or more embodiments.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 185 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include an application processor. In one example, BMC 185 may be or include an ARM Cortex-A processor. In another example, BMC 185 may be or include an Intel Atom processor. In one or more embodiments, BMC 185 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

Figure 2:
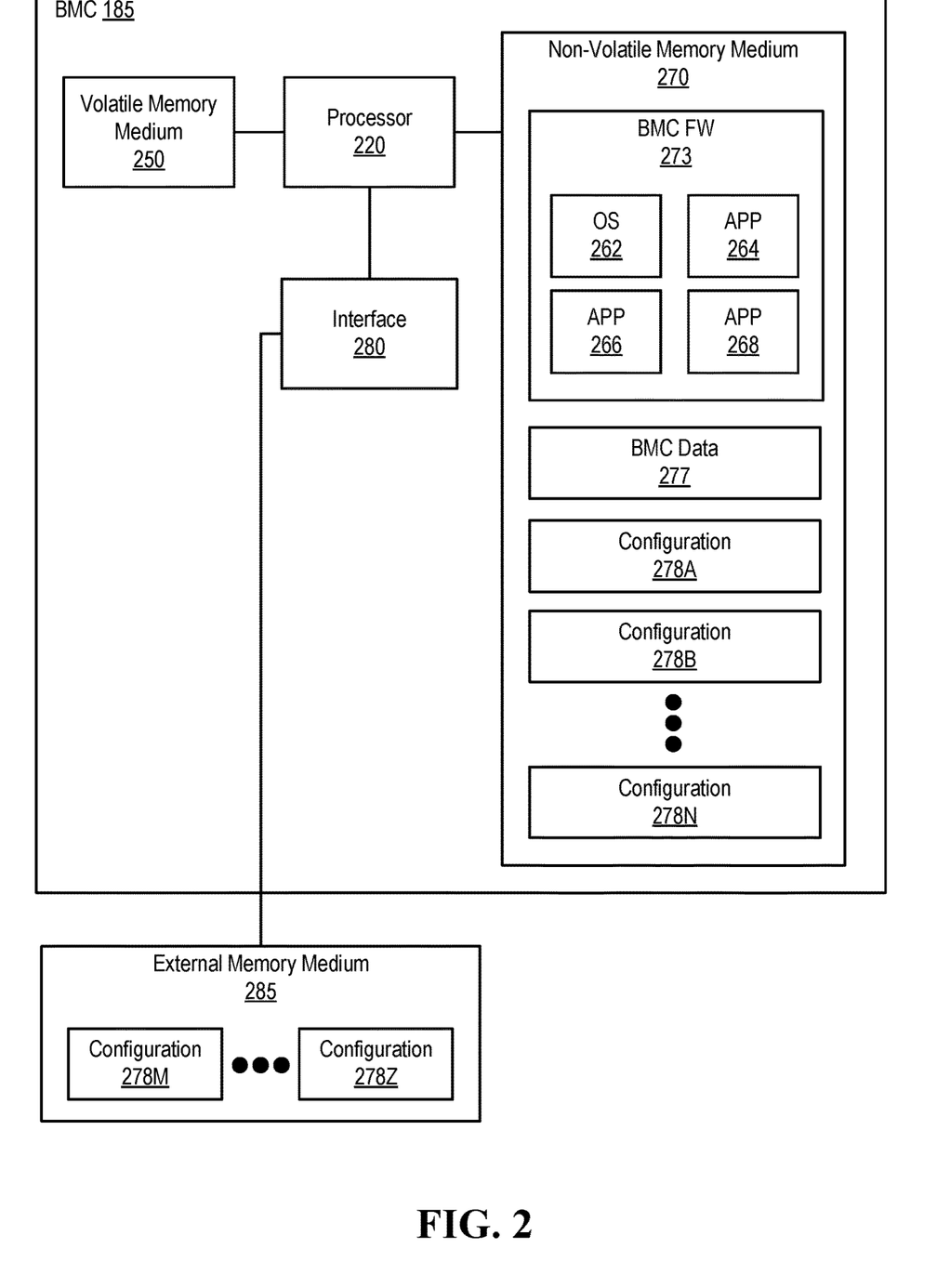
FIG. 2 illustrates an example of a baseboard management controller, according to one or more embodiments.

Turning now to FIG. 2, an example of a baseboard management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. For instance, the Unix-like operating system may be or include Linux, Free-BSD, NetBSD, OpenBSD, Minix, Xinu, or Darwin, among others. In another example, OS 262 may be or include a portable operating system interface (POSIX) compliant operating system.

In one or more embodiments, BMC 185 may store one or more configurations. As shown, non-volatile memory medium 270 may include configurations 278A-278N. In one or more embodiments, a configuration 278 may be or include a configuration for a FPGA. For example, a configuration 278 may be or include a FPGA bitstream. In one or more embodiments, a configuration 278 may be or include a partial FPGA configuration. For example, a partial FPGA configuration may configure a portion of a FPGA.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 185 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, an external memory medium 285 may be coupled to BMC 185. As illustrated, external memory medium 285 may be coupled to interface 280. As shown, external memory medium 285 may include configurations 278M-278Z. In one or more embodiments, external memory medium 285 may be coupled to BMC 185 via a network. In one or more embodiments, external memory medium 285 may be coupled to BMC 185 via a serial interface. For example, external memory medium 285 may be coupled to BMC 185 via a USB. In one or more embodiments, external memory medium 285 may one or more of a volatile memory medium and a non-volatile memory medium.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, one or more flowcharts, one or more methods, and/or one or more processes described herein. For example, non-volatile memory medium 270 and/or volatile memory medium 260 may store instructions that may be executable in accordance with at least a portion of one or more systems, flowcharts, one or more methods, and/or one or more processes described herein. In one or more embodiments, processor 220 may execute instructions in accordance with at least a portion of one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
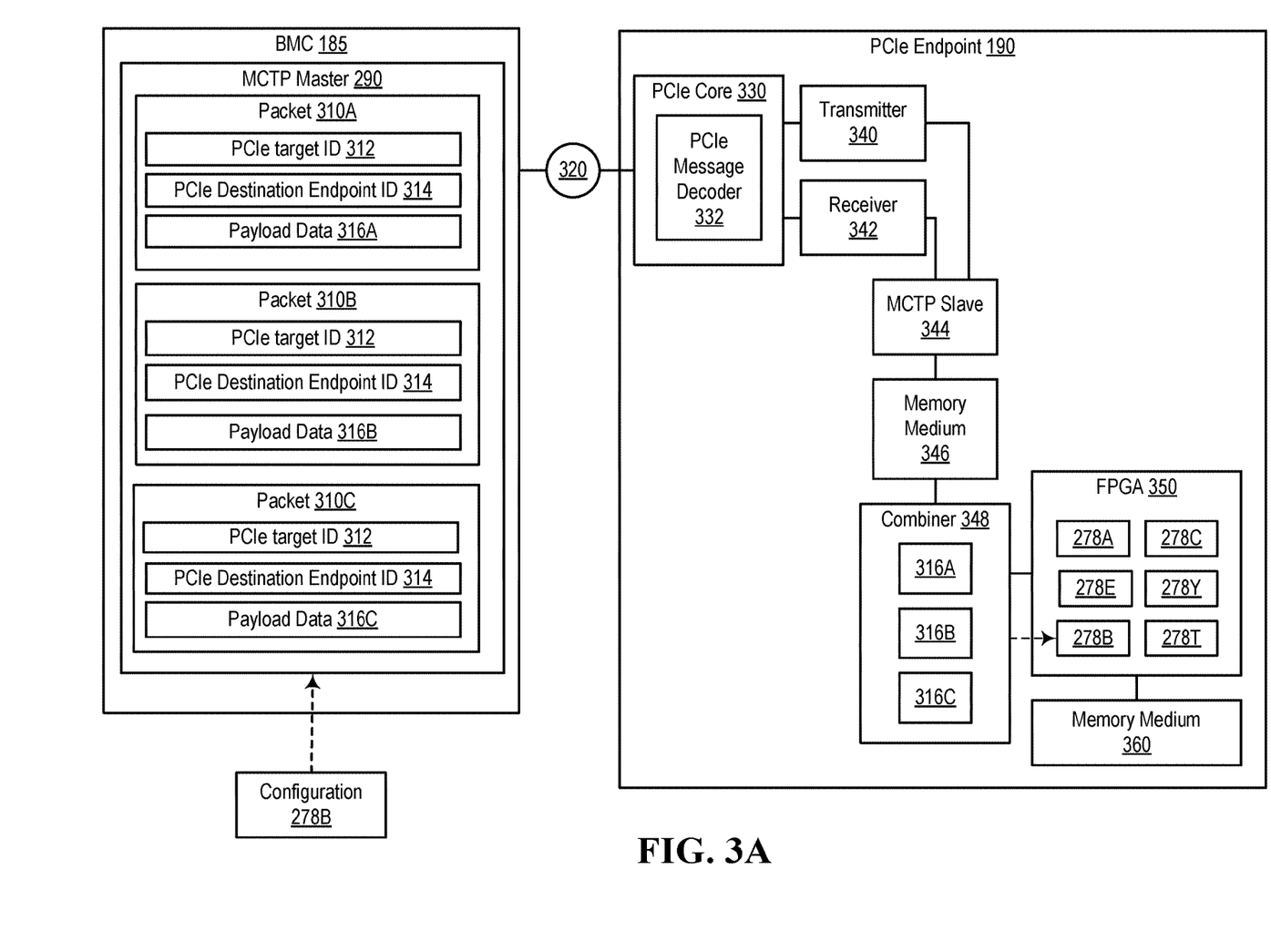
FIG. 3A illustrates an example of a baseboard management controller and a PCIe endpoint, according to one or more embodiments.

Turning now to FIG. 3A, an example of a baseboard management controller and a PCIe endpoint is illustrated, according to one or more embodiments. As shown, BMC 185 may include a Management Component Transport Protocol (MCTP) master 290. In one or more embodiments, MCTP master 290 may be or include instructions executable by processor 220. In one or more embodiments, MCTP may be or include a protocol that may support between or among multiple hardware components. In one or more embodiments, MCTP may be independent of underlying hardware. For example, MCTP may be independent of underlying physical bus properties. In one or more embodiments, MCTP may be independent of data link layer messaging utilized on the underlying hardware. For example, MCTP may be independent of data link layer messaging utilized on a bus.

In one or more embodiments, a MCTP communications model may include one or more of a message format, transport description, message exchange patterns, and operational endpoint characteristics, among others. In one or more embodiments, one or more underlying buses of MCTP may include one or more of a SMBus, an $I^2C$ bus, a serial link, PCIe, and a USB, among others. In one or more embodiments, reduced encapsulation overheads may make MCTP suitable for implementation and processing within system firmware and/or baseboard management controllers (BMCs) on a various information handling systems (e.g., servers, workstations, embedded devices, etc.). In one or more embodiments, BMC 185 may be a PCIe target from a host OS. For example, BMC 185 may be a PCIe target from OS 162.

In one or more embodiments, MCTP master 290 may receive a configuration 278. As illustrated, MCTP master 290 may receive 278B. In one or more embodiments, MCTP master 290 may separate a configuration 278 into multiple portions. For example, MCTP master 290 may embed the multiple portions of configuration 278 into respective multiple packets. In one or more embodiments, a packet may include one or more of a PCIe target ID, a PCIe Destination Endpoint ID, and payload data. For example, the payload data may include a portion of configuration 278.

As illustrated, a packet 310A may include a PCIe target ID 312, a PCIe Destination Endpoint ID 314, and payload data 316A. As shown, a packet 310B may include PCIe target ID 312, PCIe Destination Endpoint ID 314, and payload data 316B. As illustrated, a packet 310C may include PCIe target ID 312, PCIe Destination Endpoint ID 314, and payload data 316C. In one or more embodiments, MCTP master 290 may separate configuration 278B into multiple portions. For example, MCTP master 290 may embed the multiple portions of configuration 278B into respective packets 310A-310C. For instance, MCTP master 290 may embed the multiple portions of configuration 278B into respective payload data 316A-316C. In one or more embodiments, payload data 316 may be or include a MCTP message. For example, a MCTP message may include a portion of a configuration 278. For instance, the MCTP message may be or include a vendor defined message (VDM) that includes the portion of configuration 278.

As shown, BMC 185 may be coupled to PCIe endpoint 190 via an interconnect 320. In one or more embodiments, interconnect 320 may be or include a PCIe interconnect. In one or more embodiments, a PCIe interconnect may include a point-to-point communication channel between two PCIe ports. In one example, a first PCIe port may communicate with a second PCIe port via the PCIe interconnect. In another example, the second PCIe port may communicate with the first port via the PCIe interconnect. In one or more embodiments, one or more of the first PCIe port and the second PCIe port may send and/or receive one or more PCIe requests (e.g., configuration, I/O, memory read/write, etc.) and/or one or more interrupts (e.g., INTx, MSI, MSI-X, etc.). In one or more embodiments, a PCIe interconnect may include one or more PCIe lanes.

In one or more embodiments, a packet 310 may be provided, via interconnect 320, to PCIe endpoint 190 via PCIe target ID 312. For example, a packet 310 may be routed, via interconnect 320, to PCIe endpoint 190 via PCIe target ID 312. In one or more embodiments, providing a packet 310 to PCIe endpoint 190 via interconnect 320 may not involve a host OS. For example, providing a packet 310 to PCIe endpoint 190 via interconnect 320 may not involve OS 162. In one or more embodiments, providing a packet 310 to PCIe endpoint 190 via interconnect 320 may not involve a host memory medium. For example, providing a packet 310 to PCIe endpoint 190 via interconnect 320 may not involve memory medium 150. In one or more embodiments, interconnect 320 may include multiple components. For example, interconnect 320 may include one or more PCIe switches and/or one or more PCIe root complexes. For instance, a packet 310 may be forwarded from one component of interconnect 320 to another component of interconnect 320.

As illustrated, PCIe endpoint 190 may include a PCIe core 330. As shown, PCIe core 330 may include a PCIe message decoder 332. In one or more embodiments, PCIe message decoder 332 may be configured to decode MCTP messages. For example, PCIe message decoder 332 may be configured to decode vendor defined messages (VMDs). As shown, PCIe endpoint 190 may include a transmitter 340 and a receiver 342. As illustrated, PCIe core 330 may be coupled to transmitter 340 and receiver 342. As shown, PCIe endpoint 190 may include a MCTP slave 344. As illustrated, MCTP slave 344 may be coupled to transmitter 340 and receiver 342.

As shown, PCIe endpoint 190 may include a memory medium 346. In one example, memory medium 346 may include a volatile memory medium. In another example, memory medium 346 may include a non-volatile memory medium. As illustrated, memory medium 346 may be coupled to MCTP slave 344. In one or more embodiments, memory medium 346 may buffer one or more messages. In one example, memory medium 346 may buffer one or more MCTP messages. In another example, memory medium 346 may buffer one or more VDMs.

As shown, PCIe endpoint 190 may include a combiner 348. As illustrated, combiner 348 may be coupled to memory medium 346. In one or more embodiments, combiner 348 may combine two or more portions of a configuration 278 into configuration 278. As shown, combiner 348 may utilize payloads 316A-316C. For example, combiner 348 may access and/or retrieve portions of configuration 278B from payloads 316A-316C. For instance, combiner 348 may combine portions of configuration 278B to produce configuration 278B. As illustrated, combiner 348 may provide configuration 278B to a FPGA 350. As shown, PCIe endpoint 190 may include FPGA 350.

As shown, PCIe endpoint 190 may include a memory medium 360. As illustrated, memory medium 360 may be coupled to FPGA 350. In one example, memory medium 360 may include a volatile memory medium. In another example, memory medium 360 may include a non-volatile memory medium. Although not specifically illustrated, FPGA 350 may include memory medium 360, according to one or more embodiments.

In one or more embodiments, FPGA 350 may store a configuration 278 via memory medium 360. For example, FPGA 350 may store of one or more of configurations 278A, 278B, 278C, 278E, 278T, and 278Y, among others, via memory medium 360. In one instance, in response to receiving configuration 278B, FPGA 350 may store of one or more of configurations 278A, 278C, 278E, 278T, and 278Y, among others, via memory medium 360. In another instance, before receiving configuration 278B, FPGA 350 may store of one or more of configurations 278A, 278C, 278E, 278T, and 278Y, among others, via memory medium 360. In one or more embodiments, FPGA 350 may utilize a configuration 278, stored via memory medium 360 after FPGA 350 is reset or power cycled. In one or more embodiments, FPGA 350 may utilize a configuration 278, stored via memory medium 360 after a PCIe reset of PCIe endpoint 190. For example, FPGA 350 may utilize a configuration 278, stored via memory medium 360 in response to a PCIe reset of PCIe endpoint 190.

In one or more embodiments, FPGA 350 may utilize and/or implement configuration 278B. For example, FPGA 350 may utilize and/or implement configuration 278B after receiving configuration 278B from combiner 348. In one or more embodiments, FPGA 350 may utilize and/or implement configuration 278B while FPGA 350 is configured to utilized one or more of configurations 278A, 278C, 278E, 278T, and 278Y, among others. In one or more embodiments, FPGA 350 may utilize and/or implement configuration 278B while one or more of configurations 278A, 278C, 278E, 278T, and 278Y, among others, are being utilized by FPGA 350. Although not specifically illustrated, PCIe endpoint 190 may include multiple FPGAs 350, according to one or more embodiments. In one or more embodiments, a configuration 278 may include one or more of a compressor (e.g., a data compressor), a video filter, an audio filter, a video overlay, and an audio overlay, among others.

Figure 3B:
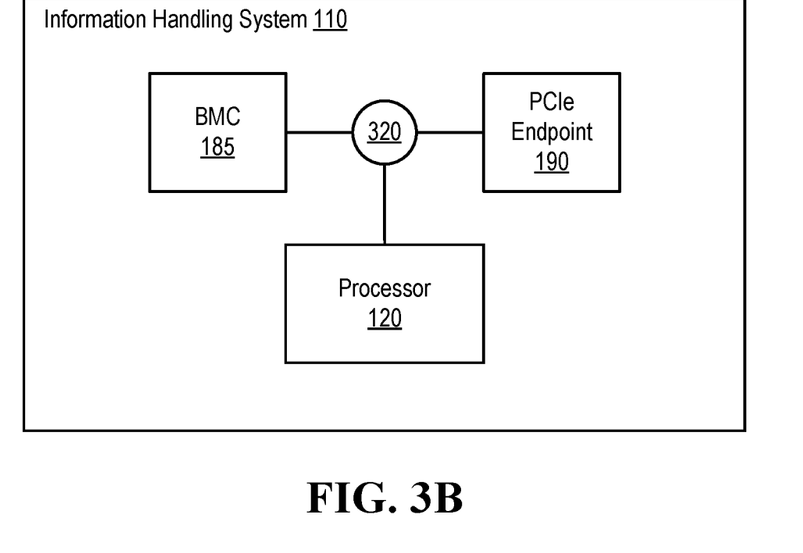
FIG. 3B illustrates a second example of an information handling system, according to one or more embodiments.

Turning now to FIG. 3B, a second example of an information handling system is illustrated, according to one or more embodiments. As shown, IS 110 may include interconnect 320. As illustrated, processor 120 may be coupled to interconnect 320. As shown, BMC 185 may be coupled to interconnect 320. As illustrated, endpoint 190 may be coupled to interconnect 320.

Figure 3C:
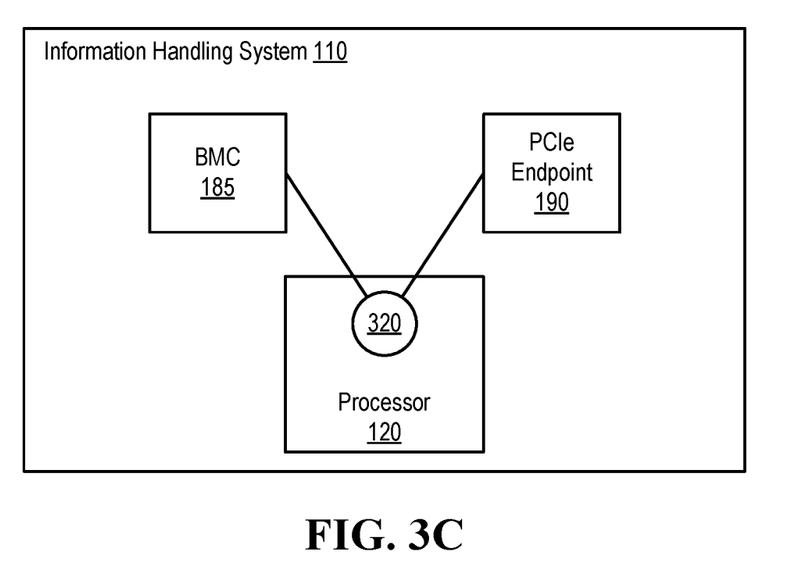
FIG. 3C illustrates another example of an information handling system, according to one or more embodiments.

Turning now to FIG. 3C, another example of an information handling system is illustrated, according to one or more embodiments. As shown, processor 120 may include interconnect 320. As illustrated, BMC 185 may be coupled to interconnect 320. As shown, endpoint 190 may be coupled to interconnect 320.

Figure 4:
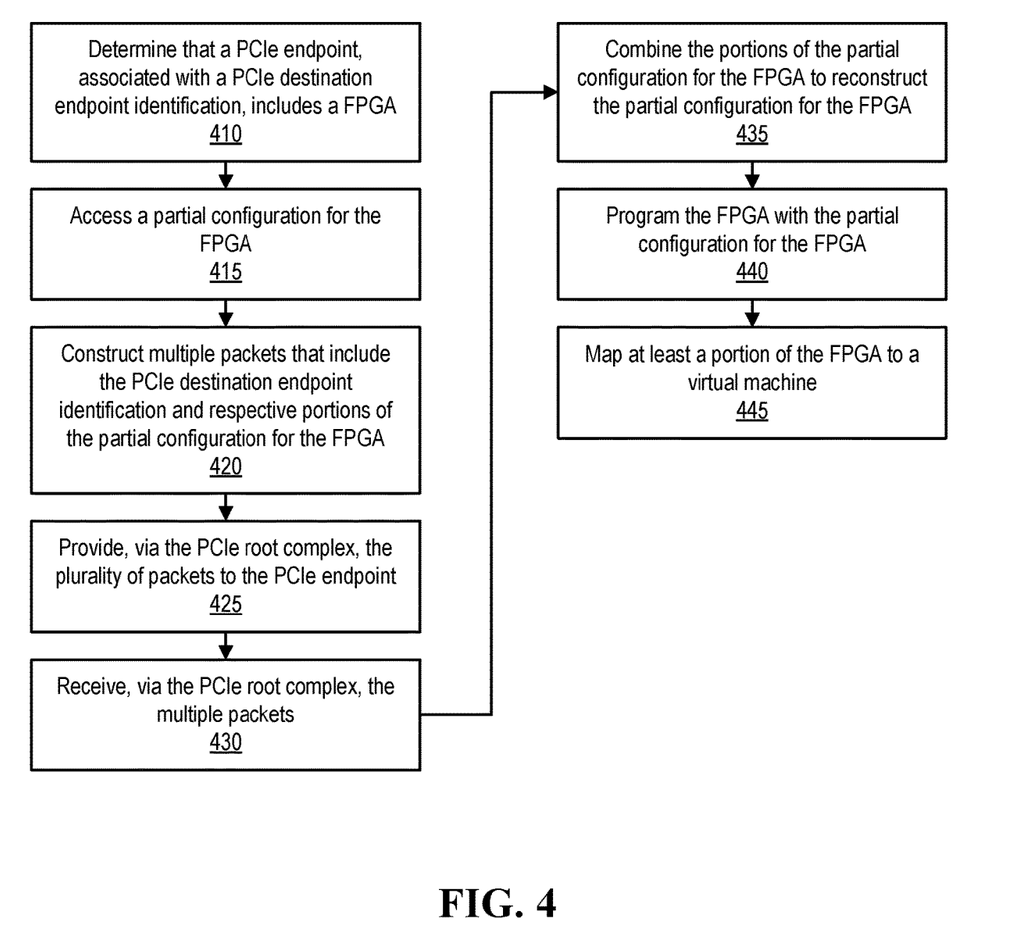
FIG. 4 illustrates an example of a method, according to one or more embodiments.

Turning now to FIG. 4, an example of a method is illustrated, according to one or more embodiments. At 410, it may be determined that a PCIe endpoint, associated with a PCIe destination endpoint identification, includes a FPGA. For example, BMC 185 may determine that a PCIe endpoint, associated with a PCIe destination endpoint identification, includes a FPGA. For instance, BMC 185 may determine that a PCIe endpoint 190, associated with a PCIe destination endpoint identification, includes FPGA 350.

At 415, a partial configuration for the FPGA may be accessed. In one example, BMC 185 may access a partial configuration for the FPGA. In one instance, BMC 185 may access a partial configuration for the FPGA via non-volatile memory medium 270. In another instance, BMC 185 may access a partial configuration for the FPGA via external memory medium 285. In one or more embodiments, external memory medium 285 may be accessed via a network. For example, accessing the partial configuration for the FPGA may include accessing the partial configuration for the FPGA via a network. In one or more embodiments, a configuration 278 may be or include a partial configuration for the FPGA. In one or more embodiments, a configuration 278 may be or include a complete configuration for the FPGA.

At 420, multiple packets that include the PCIe destination endpoint identification and respective portions of the partial configuration for the FPGA may be constructed. For example, BMC 185 may construct multiple packets that include the PCIe destination endpoint identification and respective portions of the partial configuration for the FPGA. For instance, BMC 185 may construct packets 310A-310C, which may include PCIe destination endpoint ID 314 and respective portions of partial configuration 278B. In one or more embodiments, payload data 316A-316C may include the respective portions of partial configuration 278B.

At 425, the multiple packets may be provided to the PCIe endpoint. For example, BMC 185 may provide the multiple packets to the PCIe endpoint. For instance, BMC 185 may provide packets 310A-310C to PCIe endpoint 190 via interconnect 320. In one or more embodiments, interconnect 320 may be or include a PCIe root complex. For example, BMC 185 may provide packets 310A-310C to PCIe endpoint 190 via the PCIe root complex.

In one or more embodiments, providing, via the PCIe root complex, the multiple packets to the PCIe endpoint may include providing, via the PCIe root complex, the multiple packets to the PCIe endpoint without involving a memory medium of a host information handling system. For example, providing, via the PCIe root complex, the multiple packets to the PCIe endpoint may include providing, via the PCIe root complex, the multiple packets to the PCIe endpoint without involving volatile memory medium 150 of IHS 110. In one or more embodiments, providing, via the PCIe root complex, the multiple packets to the PCIe endpoint may include providing, via the PCIe root complex, the multiple packets to the PCIe endpoint without involving a host operating system of a host information handling system. For example, providing, via the PCIe root complex, the multiple packets to the PCIe endpoint may include providing, via the PCIe root complex, the multiple packets to the PCIe endpoint without involving OS 162 of IHS 110.

At 430, the multiple packets may be received. For example, the PCIe endpoint may receive the multiple packets. For example, PCIe endpoint 190 may receive packets 310A-310C via interconnect 320. In one or more embodiments, interconnect 320 may include a PCIe root complex. For example, PCIe endpoint 190 may receive packets 310A-310C via the PCIe root complex.

In one or more embodiments, receiving, via the PCIe root complex, the multiple packets may include receiving, via the PCIe root complex, the multiple packets without involving a memory medium of a host information handling system. For example, receiving, via the PCIe root complex, the multiple packets may include receiving, via the PCIe root complex, the multiple packets without involving volatile memory medium 150 of IHS 110. In one or more embodiments, receiving, via the PCIe root complex, the multiple packets may include receiving, via the PCIe root complex, the multiple packets without involving a host operating system of a host information handling system. For example, receiving, via the PCIe root complex, the multiple packets may include receiving, via the PCIe root complex, the multiple packets without involving OS 162 of HIS 110.

At 435, the portions of the partial configuration for the FPGA may be combined to reconstruct the partial configuration for the FPGA. For example, PCIe endpoint 190 may combine the portions of the partial configuration for the FPGA to reconstruct the partial configuration for the FPGA. In one or more embodiments, payload data 316A-316C may respectively include the portions of the partial configuration for the FPGA. For example, PCIe endpoint 190 may combine the portions of the partial configuration for the FPGA to reconstruct partial configuration 278B.

In one or more embodiments, combining the portions of the partial configuration for the FPGA to reconstruct the partial configuration for the FPGA may include reconstructing the partial configuration for the FPGA from the portions of the partial configuration for the FPGA. For example, PCIe endpoint 190 may reconstruct partial configuration 278B from the portions of the partial configuration for the FPGA. For instance, PCIe endpoint 190 may reconstruct partial configuration 278B from the portions of the partial configuration for the FPGA from respective payload data 316A-316C.

At 440, the FPGA may be programmed with the partial configuration for the FPGA. For example, PCIe endpoint 190 may program FPGA 350 with partial configuration 278B. In one or more embodiments, programming the FPGA with the partial configuration for the FPGA may include configuring the FPGA with the partial configuration for the FPGA. For example, PCIe endpoint 190 may configure FPGA 350 with partial configuration 278B.

In one or more embodiments, programming the FPGA with the partial configuration for the FPGA may include programming the FPGA with the partial configuration for the FPGA while the FPGA is processing information. For example, FPGA 350 may be processing information while FPGA 350 is programmed with partial configuration 278B. In one or more embodiments, FPGA 350 may be programmed with partial configuration 278U. For example, FPGA 350 may be processing information in accordance with partial configuration 278U. For instance, FPGA 350 may be processing information in accordance with partial configuration 278U while FPGA 350 is programmed with partial configuration 278B.

At 445, at least a portion of the FPGA may be mapped to a virtual machine. For example, the at least the portion of the FPGA may be associated with the partial configuration for the FPGA. For instance, the at least the portion of the FPGA may be associated with partial configuration 278B. In one or more embodiments, mapping the at least the portion of the FPGA to the virtual machine may include mapping I/O associated with the at least the portion of the FPGA to the virtual machine. In one or more embodiments, mapping the at least the portion of the FPGA to the FPGA may include mapping one or more PCIe packets from the PCIe endpoint to the virtual machine. In one or more embodiments, mapping the at least the portion of the FPGA to the virtual machine may include mapping a bus associated with the PCIe endpoint to the virtual machine. In one or more embodiments, mapping the at least the portion of the FPGA to the FPGA may be performed after providing, via the PCIe root complex, the multiple packets to the PCIe endpoint.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system coupled to a network, the information handling system comprising:
   an information handling system processor; and
   an information handling system memory medium, coupled to the information handling system processor, that stores instructions executable by the information handling system processor;
   a Peripheral Component Interconnect Express (PCIe) root complex;
   a baseboard management controller (BMC) coupled to the PCIe root complex; and
   a PCIe endpoint, which includes a field programmable gate array (FPGA), coupled to the PCIe root complex, wherein the FPGA comprises a FPGA memory medium storing a set of configurations for the FPGA;
   wherein the BMC is configured to:
      receive an at least partial configuration over the network;
      determine, from the at least partial configuration, a PCIe destination endpoint identification corresponding to the PCIe endpoint;
      determine the PCIe endpoint includes the FPGA;
      construct a plurality of packets, wherein each packet of the plurality of packets comprises a PCIe target identification, the PCIe destination endpoint identification and a respective portion of a plurality of portions of the at least partial configuration for the FPGA; and
      provide, via the PCIe root complex, the plurality of packets to the PCIe endpoint without involving the information handling system processor or the information handling system memory medium; and
   wherein the information handling system instructions, which when executed by the information handling system processor, cause the information handling system processor to map at least a portion of the FPGA with the at least partial configuration to a virtual machine.

2. The information handling system of claim 1, wherein the PCIe endpoint is configured to receive, via the PCIe root complex, the plurality of packets, the PCIe endpoint comprising:
   a PCIe core configured to decode each packet of the plurality of packets;
   a first memory medium configured to buffer each decoded packet as a portion of the at least partial configuration;
   a combiner configured to retrieve two or more portions of the at least partial configuration from the first memory medium and combine the portions of the partial configuration for the FPGA to reconstruct the partial configuration for the FPGA; and
   a second memory medium configured to store the at least partial configuration, the second memory medium associated with the FPGA,
      wherein the PCIe endpoint is configured to at least FPGA; and
   the information handling system instructions, which when executed by the information handling system processor, cause the information handling system processor to map the FPGA to a hypervisor associated with the virtual machine.

3. The information handling system of claim 2, wherein the FPGA is configured to process information while the PCIe endpoint programs the FPGA with the at least partial configuration for the FPGA.

4. The information handling system of claim 1, wherein the BMC is configured to provide, via the PCIe root complex, the plurality of packets to the PCIe endpoint without involving a volatile memory medium of the information handling system memory medium.

5. The information handling system of claim 1, wherein the BMC is configured to provide, via the PCIe root complex, the plurality of packets to the PCIe endpoint without involving a host operating system executing on the information handling system processor.

6. The information handling system of claim 1, wherein the BMC is configured to receive the at least partial configuration for the FPGA from a remote access controller via a network.

7. The information handling system of claim 1, wherein the FPGA is configurable as a hardware component; and
the BMC processor is configured to:
determine one or more attributes of a workload;
determine a hardware component utilized by the workload; and
determine a configuration of the set of configurations for the FPGA for utilizing the FPGA as the hardware component.

8. The information handling system of claim 1, wherein, to map the at least the portion of the FPGA with the at least partial configuration to the virtual machine, the instructions are executable by the information handling system processor to map the at least the portion of the FPGA with the at least partial configuration to the virtual machine via a hypervisor associated with the virtual machine.

9. A computer-implemented method, comprising:
receiving, by a baseboard management controller (BMC) in an information handling system, a request for a set of configuration capabilities of a Peripheral Component Interconnect Express (PCIe) endpoint in the information handling system;
determining, by the BMC, that a PCIe endpoint associated with a PCIe destination endpoint identification includes a field programmable gate array (FPGA);
receiving an at least partial configuration for the FPGA;
constructing a plurality of packets, wherein each packet of the plurality of packets comprises a PCIe target identification, the PCIe destination endpoint identification and a respective portion of a plurality of portions of the at least partial configuration for the FPGA;
providing, via a PCIe root complex, the plurality of packets to the PCIe endpoint without involving an information handling system processor or an information handling system memory medium;
reconstructing the at least partial configuration by the PCIe endpoint;
programming the FPGA with the at least partial configuration by the PCIe endpoint; and
after the providing, via the PCIe root complex, the plurality of packets to the PCIe endpoint, mapping at least a portion of the FPGA to a virtual machine.

10. The method of claim 9, wherein reconstructing the at least partial configuration by the PCIe endpoint comprises:
receiving, via the PCIe root complex, the plurality of packets;
decoding each packet by a message decoder in the PCIe endpoint;
buffering the decoded packet in a first memory medium communicatively coupled to the message decoder;
retrieving two or more portions of the at least partial configuration from the first memory medium by a combiner;
combining the two or more portions of the at least partial configuration for the FPGA to reconstruct the at least partial configuration for the FPGA; and
storing the at least partial configuration in a second memory medium associated with the FPGA.

11. The method of claim 9, wherein the programming the FPGA with the at least partial configuration for the FPGA comprises programming the FPGA with the at least partial configuration for the FPGA while the FPGA is processing information.

12. The method of claim 9, wherein the providing, via the PCIe root complex, the plurality of packets to the PCIe endpoint comprises providing, via the PCIe root complex, the plurality of packets to the PCIe endpoint without involving a memory medium of a host information handling system.

13. The method of claim 9, wherein the providing, via the PCIe root complex, the plurality of packets to the PCIe endpoint comprises providing, via the PCIe root complex, the plurality of packets to the PCIe endpoint without involving a host operating system of a host information handling system.

14. The method of claim 9, wherein the receiving the at least partial configuration for the FPGA comprises receiving the at least partial configuration for the FPGA via a network.

15. The method of claim 9, wherein the receiving the at least partial configuration for the FPGA comprises receiving the at least partial configuration for the FPGA from a non-volatile memory medium.

16. A system for configuring a field programmable gate array (FPGA) in a Peripheral Component Interconnect Express (PCIe) endpoint in an information handling system, the system comprising:
a baseboard management controller, comprising:
at least one processor; and
a memory medium, coupled to the at least one processor, that stores:
a plurality of configurations associated with the FPGA; and
a set of instructions executable by the at least one processor, which when executed by the at least one processor, cause the baseboard management controller to:
receive an at least partial configuration for the FPGA;
determine a Peripheral Component Interconnect Express (PCIe) endpoint, associated with a PCIe destination endpoint identification, includes the FPGA;
separate the at least partial configuration into a plurality of packets, wherein each packet of the plurality of packets comprises a PCIe target identification, the PCIe destination endpoint identification and a respective portion of a plurality of portions of the at least partial configuration for the FPGA; and
provide, via the PCIe root complex, the plurality of packets to the PCIe endpoint corresponding to the PCIe endpoint identification without involving the information handling system processor or the information handling system memory medium; and
the PCIe endpoint comprises:
the FPGA;
a PCIe core having a message decoder configured to decode each packet of the plurality of packets to determine the respective portion of the plurality of portions;
a first memory medium communicatively configured to buffer the plurality of portions;
a combiner configured to combine the plurality of portions to reconstruct the at least partial configuration; and
a second memory medium configured to store the at least partial configuration, the second memory medium associated with the FPGA, wherein the PCIe endpoint is configured to program the FPGA with the at least partial configuration stored in the second memory medium.

17. The system of claim 16, wherein, to receive the at least partial configuration for the FPGA, the set of instructions are executable to receive the at least partial configuration for the FPGA from a remote access controller via a network.

18. The system of claim 16, wherein, to provide, via the PCIe root complex, the plurality of packets to the PCIe endpoint, the set of instructions are executable to provide, via the PCIe root complex, the plurality of packets to the PCIe endpoint without involving a volatile memory medium of the information handling system and without involving a host operating system of the information handling system.

* * * * *